United States Patent [19]

Persson

[11] Patent Number: 5,274,882
[45] Date of Patent: Jan. 4, 1994

[54] HINGE MECHANISM

[75] Inventor: Per-Hakan Persson, Kavlinge, Sweden

[73] Assignee: Ericsson GE Mobile Communications Inc., Research Triangle Park, N.C.

[21] Appl. No.: 845,184

[22] Filed: Mar. 3, 1992

[51] Int. Cl.⁵ ............................................. E05D 7/10
[52] U.S. Cl. .......................................... 16/303; 16/229; 16/329; 16/386; 16/341
[58] Field of Search ............... 16/50, 229, 256, 303, 16/317, 334, 341, 354, 386, 328, 329, 330

[56] References Cited

U.S. PATENT DOCUMENTS

| 571,133 | 11/1896 | Hoffman | 16/303 |
|---|---|---|---|
| 765,372 | 7/1904 | Bading . | |
| 996,413 | 6/1911 | Katzenberger . | |
| 1,049,072 | 12/1912 | Frey | 16/317 |
| 1,107,076 | 8/1914 | Keene . | |
| 1,425,995 | 8/1922 | McGiveney . | |
| 1,912,289 | 5/1933 | March . | |
| 2,003,274 | 5/1935 | Celander | 16/297 |
| 3,401,422 | 9/1968 | Ventura | 16/317 |
| 3,460,190 | 8/1969 | MacDonald | 16/303 |
| 3,550,186 | 12/1970 | Swartz | 16/303 |
| 3,648,327 | 3/1972 | Edeus | 16/317 |
| 3,671,998 | 6/1972 | Ruiz | 16/229 |
| 4,368,558 | 1/1983 | Grass | 16/238 |
| 4,494,273 | 1/1985 | Straus | 16/303 |
| 4,562,656 | 1/1986 | Kristofich . | |
| 4,570,290 | 2/1986 | Anderson | 16/229 |
| 4,594,750 | 6/1986 | Carcas | 16/229 |
| 4,645,905 | 2/1987 | Ming . | |
| 4,787,120 | 11/1988 | Haigh | 16/317 |
| 4,822,965 | 4/1989 | Hyogo et al. | 16/353 |
| 4,831,655 | 5/1989 | Buettner | 16/229 |
| 5,109,571 | 5/1992 | Ohshima et al. | 16/330 |

FOREIGN PATENT DOCUMENTS

| 1926341 | 11/1970 | Fed. Rep. of Germany | 16/265 |
|---|---|---|---|
| 1128244 | 1/1957 | France | 220/338 |
| 52-52452 | 4/1977 | Japan | 16/50 |

Primary Examiner—Lowell A. Larson
Assistant Examiner—Donald M. Gurley
Attorney, Agent, or Firm—Burns, Doane, Swecker & Mathis

[57] ABSTRACT

In a hinge mechanism, a first hinge portion and a second hinge portion are urged toward predetermined angular relationships relative to one another. A force, directed outwardly from the first hinge portion, is applied by an axle pivotally connecting the first and second hinge portions and having a V-shaped tip against a V-shaped groove in the second hinge portion, urging the V-shaped tip and groove to engage. In addition to being urged toward predetermined angular relationships, the first and second hinge portions are kept in predetermined angular relationships until a torsional force is applied to one of the hinge portions to overcome forces keeping the V-shaped tip and groove in engagement.

19 Claims, 6 Drawing Sheets

HINGE MECHANISM

BACKGROUND

This invention relates to a hinge mechanism for holding hinge portions in predetermined positions relative to one another, and more particularly to a hinge mechanism capable of urging hinge portions toward predetermined positions when the hinge portions are in intermediate positions between the predetermined positions.

Typical hinge mechanisms consist of a pair of hinge portions, each formed with some structure for receiving an axle, such as a bore, a recess, or an eyelet, and an axle passing through the axle receiving structures of the hinge portions and permitting the hinge portions to rotate relative to one another about the axis formed by the axle. In certain applications, it has been found desirable to use hinge mechanisms having hinge portions capable of being held in particular, predetermined angular relationships relative to one another. It has also been found desirable to use hinge mechanisms having hinge portions that are urged to assume particular, predetermined angular relationships relative to one another when the hinge portions are not already being held in those angular relationships. Such applications include spring loaded, automatically closing refrigerator doors, such as described in U.S. Pat. No. 2,003,274 to Celander, gravity hinges of the type occasionally used in so-called "cafe doors," such as described in U.S. Pat. No. 3,648,327 to Edeus, and multiple position hinges, such as described in the mounting frame of U.S. Pat. No. 4,562,656 to Kristofich.

In hinge mechanisms of the type with which the present invention is concerned, first and second hinge portions are urged toward predetermined angular relationships relative to one another and held in those relationships by male and female engaging members associated with first and second hinge portions. Often, the male engaging member is a rod having V-shaped tips and the female engaging member is a V-shaped groove. As shown, for example, in U.S. Pat. No. 3,460,190 to MacDonald, the male engaging member may be adapted to be axially movable and non-rotatable within one hinge portion, and axially movable and rotatable relative to, and engageable with, the female engaging member on the other hinge portion. In such hinge mechanisms, the female engaging member is non-rotatable and not axially movable relative to the other hinge portion. A spring is provided to urge the male engaging member against the female engaging member such that, when the male and female engaging members are aligned, the hinge portions are held at predetermined angular relationships relative to one another.

Typically, male and female engaging members are arranged on hinge portions such that alignment of the male and female engaging members occurs when the hinge portions are in an angular relationship relative to each other that corresponds to a door closed, a door fully open, or any other desired condition. When V-shaped male and female engaging member are used, there will generally be two hinge portion positions, separated by 180°, wherein the engaging members are aligned with one another.

When the male and female engaging members are not aligned, it is possible to cause them to tend toward alignment by providing a spring of sufficient force to overcome frictional forces between the unaligned male and female engaging members. The tendency toward alignment of male and female engaging members can be further enhanced by the selection of particular profiles for the male and female engaging members. It is known, for instance, to use U-shapes, V-shapes, and various other cam profiles for male and female engaging members. Further, the tendency toward alignment will be a function of such factors as the depth of the female engaging member and the height of the corresponding male engaging member, and the use, if any, of lubricant.

Known hinge mechanisms of the type having hinge portions that are capable of being urged toward predetermined angular relationships relative to one another or of being held in predetermined angular relationships relative to one another are generally characterized by their use of numerous parts requiring special machining or forming operations. In the above-cited U.S. Pat. No. to MacDonald, for instance, a door hinge with means for urging hinge portions toward a predetermined position requires a hinge pin to keep the hinge portions aligned over the entire range of motion of the hinge. Further, machining or forming operations to accommodate members for urging hinge portions toward a predetermined position as well as separate machining or forming operations to accommodate the hinge pin passing through each element of the hinge are necessary.

SUMMARY

In accordance with one aspect of the present invention, a hinge mechanism is provided having a first hinge portion that includes a non-circular recess extending into the first hinge portion along an axis substantially perpendicular to a side of the first hinge portion to a predetermined recess depth. A compressible, resilient member is disposed in the non-circular recess.

The hinge mechanism is further provided with a second hinge portion. The second hinge portion includes a bore extending partially through the second hinge portion along an axis substantially perpendicular to a side of the second hinge portion to a predetermined bore depth at a bottom of the bore, the bottom of the bore having a substantially V-shaped groove therein, the V-shaped groove being formed at a predetermined angle relative to the side of the second hinge portion.

An axle is provided for pivotally connecting the first and second hinge portions. The axle includes a flange portion having a predetermined height and a first and second side, and is insertable in, axially movable in, and non-rotatable relative to the non-circular recess. The axle also includes an elongated portion having a predetermined length and a first and second end. The elongated portion is insertable in, axially movable in, and rotatable relative to the bore. The elongated portion projects, at the first end thereof, from the first side of the flange portion. The elongated portion is formed with a substantially V-shaped tip at the second end thereof. The V-shaped tip is formed at a predetermined angle relative to the flange portion.

The axis of the non-circular recess of the first hinge portion is aligned with the axis of the bore of the second hinge portion to form a common axis. The first and second hinge portion are in a substantially abutting relationship. The predetermined recess depth is at least as great as the predetermined height of the flange portion plus the predetermined length of the elongated portion. The second side of the flange portion of the axle abuts the compressible, resilient member such that the V-shaped tip of the elongated member is urged against the bottom of the bore and toward engagement with the V-shaped groove.

In a further aspect, the hinge mechanism may include a first hinge portion with two mirror image opposed sides, a second and a third hinge portion that are mirror images of one another, and a first and a second axle that are identical each other, the first hinge portion being fitted between the second and third hinge portions.

In a further aspect, the hinge mechanism may include a second hinge portion with two mirror image opposed sides, a first and a third hinge portion that are mirror images of one another, and a first and second axle that are identical to one another, the second hinge portion being fitted between the first and third hinge portions.

In a further aspect, the hinge mechanism may include a non-circular recess including two substantially parallel sides, and the periphery of the flange portion includes two non-parallel sides for fitting between the two substantially parallel sides of the recess.

In a further aspect, the V-shaped tip of the axle may be aligned with the V-shaped groove of the bore when the first and second hinge portions are disposed at predetermined angles relative to one another.

In a further aspect, multiple V-shaped grooves may be provided at the bottom of the bore.

In a further aspect, a hinge mechanism may include a first hinge portion, a second hinge portion, and an axle. The axle may be a U-shaped bar spring that is fitted in a recess in a first hinge portion and includes elongated portions perpendicular to the top of the "U" that extend outwardly from the first hinge portion. Ends of the elongated portions may have V-tips.

In yet another aspect of the invention, a portable apparatus having a hinge mechanism is provided. The apparatus includes an apparatus door having a first hinge portion, an apparatus body having a second hinge portion, and an axle for pivotally connecting the first and second hinge portions.

In still a further aspect of the invention, a portable apparatus having a hinge mechanism has an apparatus door including a telephone mouthpiece, and an apparatus body having a telephone keyboard, and the apparatus door covers the telephone keyboard when the first and second hinge portions are in a closed position.

BRIEF DESCRIPTION OF THE DRAWINGS

The features and advantages of the present invention will be well understood by reading the following detailed description in conjunction with the drawings in which like numerals indicate similar elements and in which.

DETAILED DESCRIPTION

Figure 1:
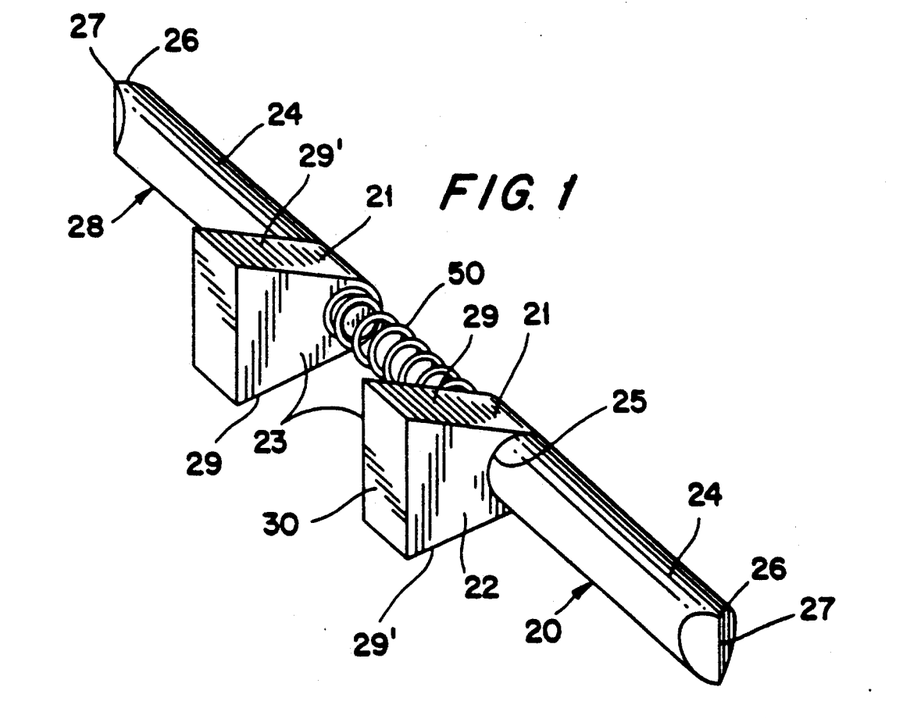
FIG. 1 is a perspective view of a pair of axles and a compression member according to an embodiment of the present invention.
Figure 2:
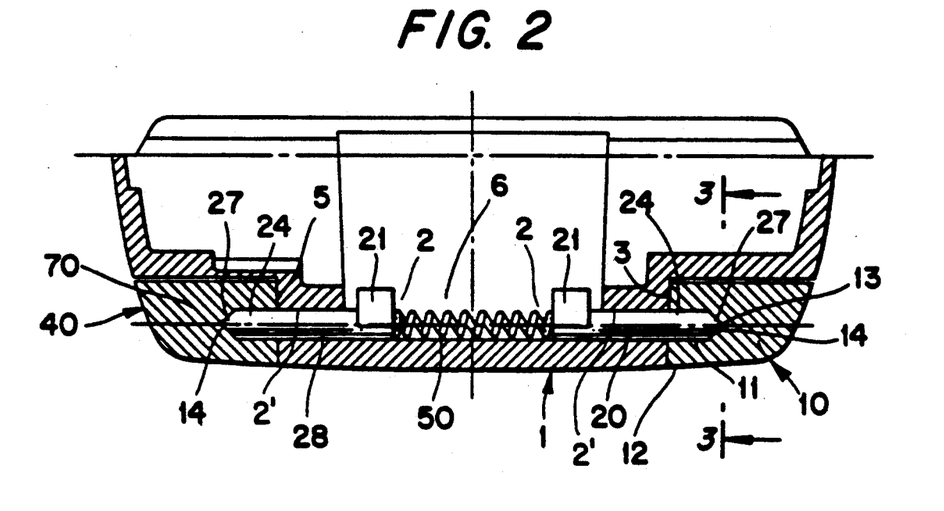
FIG. 2 is a cross-sectional view of an embodiment of the hinge mechanism of the present invention.
Figure 3:
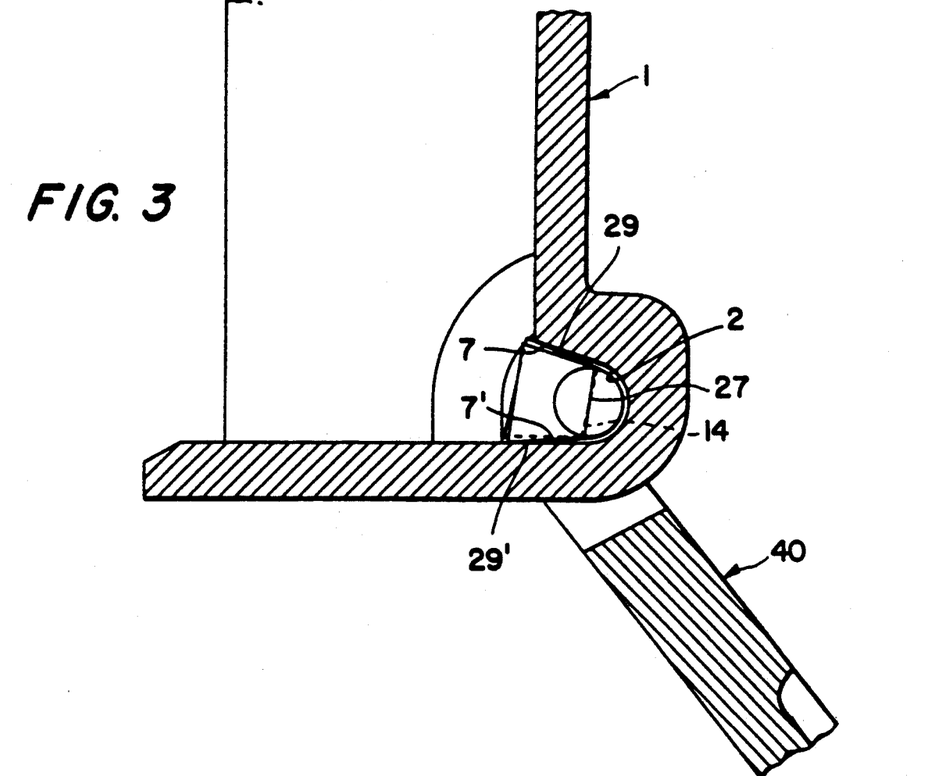
FIG. 3 is a side cross-sectional view taken at section 3—3 of FIG. 2.

With reference to FIGS. 1, 2, and 3, an embodiment of a hinge mechanism includes a first hinge portion 1, a second hinge portion 10, a third hinge portion 40, first and second axles 20, 28, and a compressible, resilient member 50 forcing the first and second axles outwardly from the first hinge portion 1. The first hinge portion 1 has a side 3 and an opposite side 5. The opposite side 5 of the first hinge portion 1 and the third hinge portion 40 are mirror images of the side 3 of the first hinge portion and the second hinge portion 10, respectively, and the axles 20 and 28 are identical to one another, and all references to the side 3 of the first hinge portion 1, the second hinge portion 10, and the first axle 20 are to be understood to apply as well to the opposite side 5 of the first hinge portion 1, the third hinge portion 40, and the second axle 28, except as otherwise indicated.

The axle 20 includes a flange portion 21 having a first side 22 and a second side 23, and an elongated portion 24 having a first end 25 and a second end 26. The elongated portion 24 projects from the first side 22 of the flange portion 21 at the first end 25 of the elongated portion 24. The flange portion 21 includes a periphery 30 of a generally non-circular shape and a known thickness, the elongated portion 24 is of a known length, and the thickness of the flange portion 21 and the length of the elongated portion 24 determine the overall length of the axle 20. The second end 26 of the elongated portion 24 has a V-shaped tip 27 that is oriented at a known angle relative to the periphery 30 of the flange portion 21.

Figure 8:
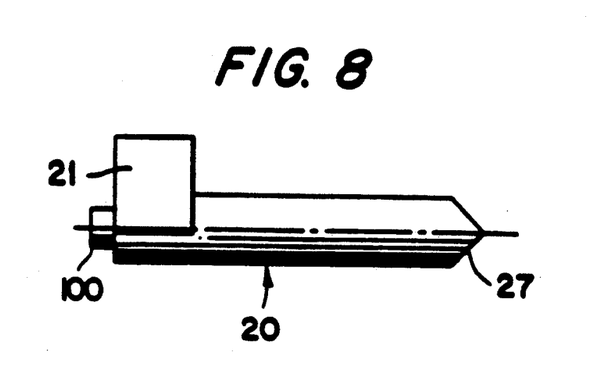
FIG. 8 is a side view of an axle of an embodiment of the present invention.

In the hinge mechanism shown in FIGS. 1 and 2, a compressible, resilient member 50 abuts the second side 23 of the flange portion for forcing the axle 20 outwardly relative to the first hinge portion 1. FIGS. 1 and 2 show a compressible, resilient member 50 consisting of a coil spring, but any suitable, compressible, resilient device may be used, including, for example, bar springs and foam rubber. In other embodiments of the hinge mechanism, it may be desirable to include a projecting member 100, seen in FIGS. 8 and 8A, on, or a recess (not shown) in the second side of the flange for preventing movement of the compressible, resilient member 50 relative to the flange 21. This object can also be accomplished by fastening the compressible, resilient member 50 to the flange 21, such as with adhesive or with mechanical fasteners.

As shown with reference to FIGS. 2 and 3, the first hinge portion 1 is provided with a pair of non-circular recesses 2,2 extending into the side 3 and the opposite side 5 of the first hinge portion 1. Each recess, 2,2 is shaped to receive the flange portion 21 of the axle 20 and permit axial, but not rotational, movement of the axle 20 in the recess 2. As shown, for example, in FIG. 2, the recesses 2,2 receive two oppositely oriented axles 20, 28, which are forced outwardly relative to the first hinge portion 1 by a common compressible, resilient member 50 in a passage 6 connecting the recesses.

Figure 9:
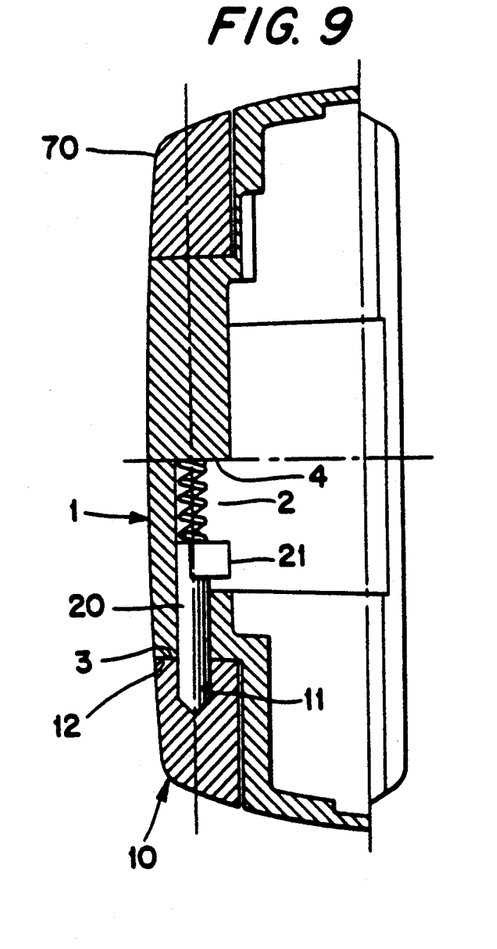
FIG. 9 is a cross-sectional view of an embodiment of the hinge mechanism of the present invention.

As seen in FIG. 9, it is equally possible to extend a recess 2 only partially into the side 3 of the first hinge portion 1 and supply a compressible, resilient member 50 at the bottom 4 of each recess 2 for forcing a single axle 20 outwardly relative to the first hinge portion 1. If, as seen in FIG. 2 a passage 6 is provided between a recess 2 in a side 3 and a recess 2 in an opposite side 5, the passage 6 may be configured in any desired shape, but it will likely be the same shape as the recesses 2 for ease of manufacturing. In all of the embodiments of the invention thus far described, substantially the entire length of the axle 20 or the axles 20, 28, and the compressible resilient member 50, or the compressible, resilient members 50, 50, are able to be forced into the recess, or recesses 2, 2 or recesses and passage 6, of the first hinge portion 1 against the force of the compressible, resilient member, or members. When the axle 20 and the compressible, resilient member are placed in the recess 2 of the first hinge portion 1, the equilibrium (not compressed) condition of the compressible, resilient member 50 causes, a portion of the elongated portion 24 to extend beyond the side 3 of the first hinge portion 1.

As shown in FIG. 2, the second hinge portion 10 is provided with a bore 11 extending partially into the side 12 of the second hinge portion 10. The bore 11 is shaped to receive the elongated portion 24 of the axle 20 and permit axial and rotational movement of the axle 20 in the bore. The bottom bottom 13 of the bore 11 is grooved in a V-shape 14 for receiving the V-shaped tip 27 of the axle 20. The bore 11 extends into the side 12 of the second hinge portion to a depth less than or equal to the length of the extending portion 28 of the elongated portion 24 of the axle 20. It is preferred that the depth to the bottom 13 of the bore 11 be chosen to be sufficiently shorter than the extending portion so that the compressible, resilient member 50 is always compressed when the hinge mechanism is assembled.

As seen with reference to FIG. 2, for example, the non-circular recesses 2,2 may include portions 2', 2' through which the elongated portions 24,24 of the axles 20,28 are adapted to extend, and through which the flanges 21,21 of the axles are not adapted to extend. In this embodiment, the axles 20,28 are installed in the recesses 2,2 through one or more open areas in the first hinge portion 1 so that the flanges 21,21 of the axles 20,28 are disposed in the non-circular recesses 2,2 and portions of the elongated portions 24,24 extend through the portions 2',2' so that the second ends 26,26 of the axles extend out of the side 3 and the opposite side 5 of the first hinge portion. The portions 2',2' are not shown in FIG. 3, taken at section 3—3 of FIG. 2.

FIGS. 2 and 3 show the V-shaped tip 27 of the axle 20 aligned with the V-shaped groove 14 (shown by dashed lines adjacent the tip 27) at the bottom 13 of the bore 11 in the second hinge portion 10 (not shown in FIG. 3). Rotation of the first hinge portion 1 relative to the second hinge portion 10 to a position other than the aligned position is possible only if the V-shaped tip 27 rises out of the V-shaped groove 14, as will occur when a sufficient torsional force is applied to either the first hinge portion 1 or the second hinge portion 10 to overcome frictional forces between the tip and the groove and any forces tending to compress the tip and the groove together, such as gravity and the force of the compressible, resilient member 50. Thus, if the compressible, resilient member 50 is compressed in this aligned position, or is at the above-mentioned equilibrium condition, the V-shaped tip 27 will have a greater tendency to resist rising out of the V-shaped groove 14, and the first and second hinge portions will tend to be held in the angular relationship corresponding to the aligned position.

Figure 4:
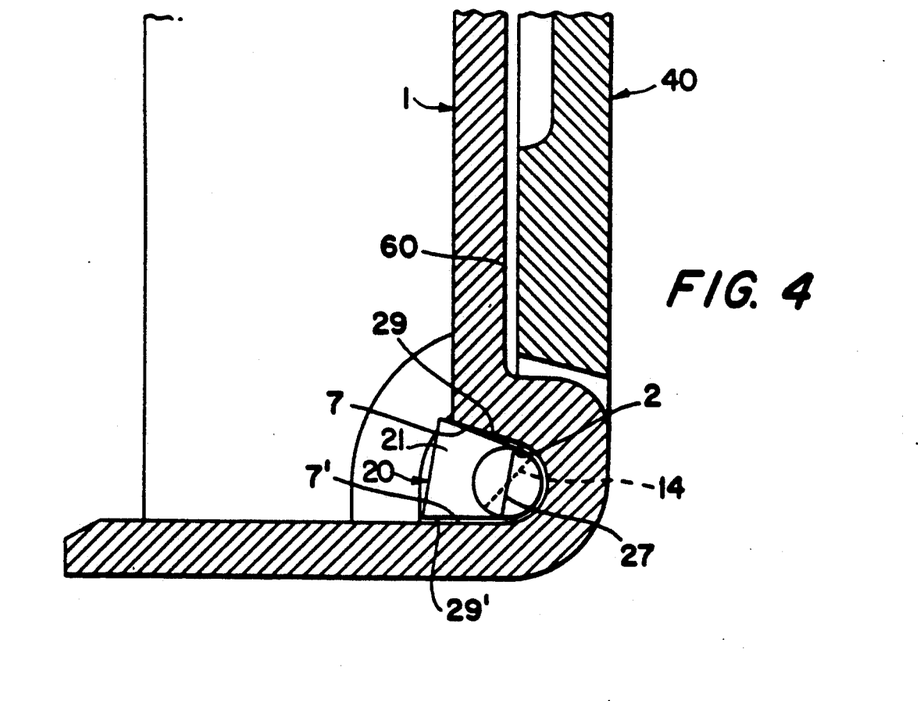
FIG. 4 is a side cross-sectional view of an embodiment of the hinge mechanism of the present invention taken at section 4—4 of FIG. 5.
Figure 5:
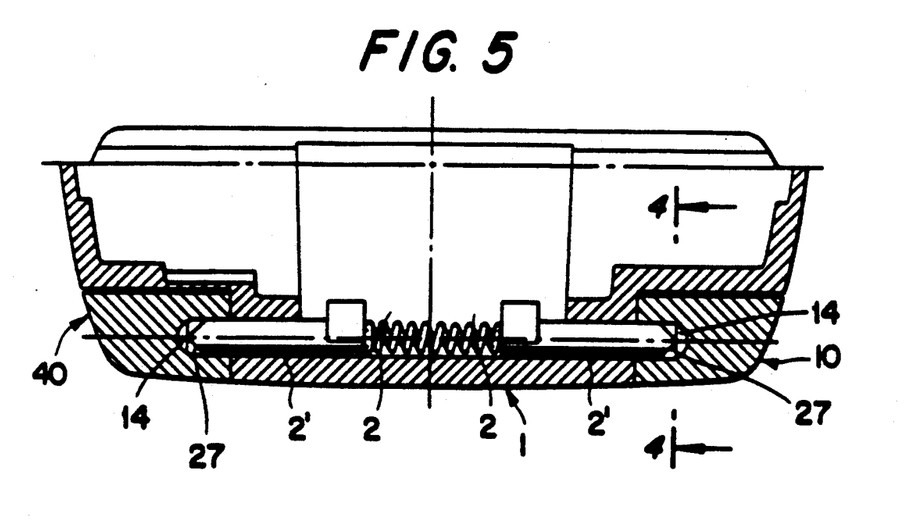
FIG. 5 is a cross-sectional view of an embodiment of the hinge mechanism of the present invention.

FIGS. 4 and 5 show the same V-shaped tip 27 and the V-shaped groove 14 unaligned. If the compressible, resilient member 50 is compressed, the V-shaped tip 27 will move toward alignment with the V-shaped groove 14, even when no external torsional forces are applied to the hinge portions, when the frictional and other forces resisting movement are overcome by compressive and other forces. In FIG. 4, the V-shaped tip 27 will tend to move counter-clockwise to align with the V-shaped groove 14 in the orientation closest to the existing orientation. In this example, however, the alignment will not occur because the second hinge portion 10 is blocked from further counter-clockwise movement by a stop 60 consisting of a part of the first hinge portion 1.

Figure 6:
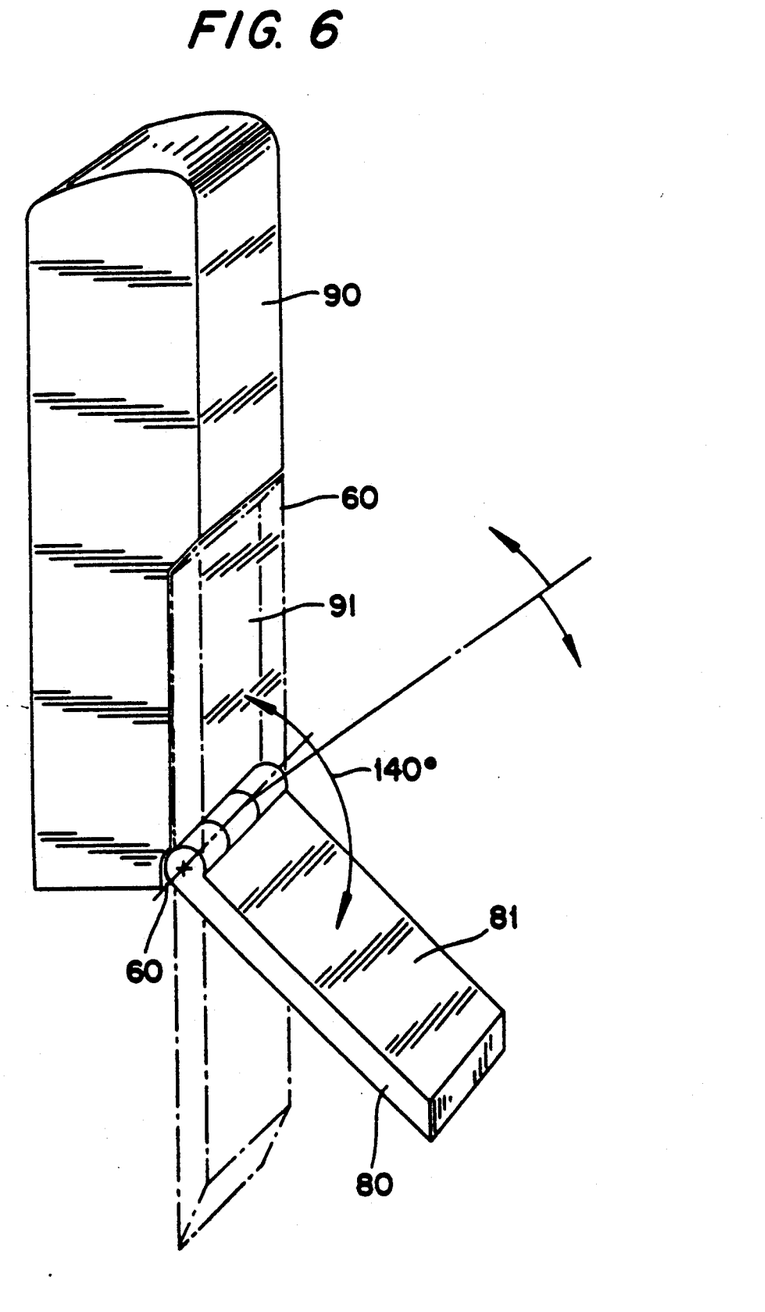
FIG. 6 is a perspective view of a portable apparatus incorporating a hinge mechanism.

FIG. 6 shows an apparatus having an apparatus door 80 and an apparatus body 90 which are attached, in part, by a hinge mechanism. The apparatus may be a cellular telephone, the door 80 including a telephone mouthpiece 81 and the body 90 including a telephone keyboard 91 which is covered by the door 80. The apparatus is provided with two stops 60 permitting a range of motion of the door 80 of only 180° relative to the body 90.

Although concealed by the hinge mechanism of the apparatus, the V-shaped tips 27 of the axle 20 align with the V-shaped grooves 14 of the second hinge portion 10 at a position 140° clockwise, in this view, from a position wherein the door 80 is closed over the body 90. While the tips and grooves are also aligned at a position 40° counter-clockwise from the door closed position, the stops 60 prevent rotation of the door 80 to this position. Nonetheless, if the compressible, resilient member 50 compresses the V-shaped tips against the V-shaped groove, the door 80 tends to remain in the door closed position because the V-shaped tips 27 will still be urged toward aligning with the V-shaped groove 14 at the orientation of the V-shaped groove angularly closest to the orientation of the V-shaped tip. Thus, in this example, the door 80 will tend toward the door closed position until it is rotated 50° clockwise from the door closed position, after which angle the door open position is angularly closer than the door closed position, and the door will tend toward the door open position. Naturally, the existence or location of stops 60 and the orientation of aligned positions of tips and grooves will vary from application to application.

Figure 7A:
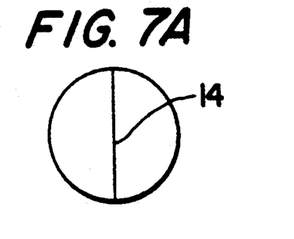
FIGS. 7A–7C are views of axle receiving bores according to embodiments of the present invention.
Figure 7B:
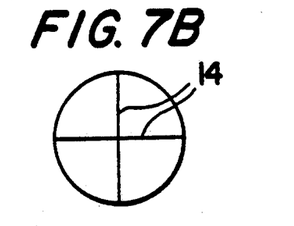
Figure 7C:
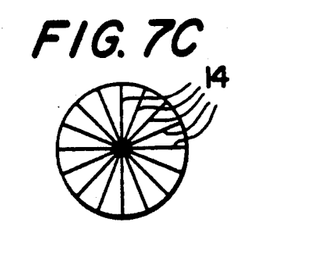

The hinge mechanism has thus far been described as having a bore with a single V-shaped groove, such as is shown in FIG. 7A. However, in the further embodiment of the present invention shown in FIGS. 7B–7C, multiple grooves are provided at the bottom of the second hinge portion so that there are multiple, optional angular relationships at which the first hinge portion 1 can be held, and toward which it can be urged, relative to the second hinge portion 10. If desired, multiple tips corresponding to the multiple grooves are provided at the second end of the elongated portion for meshing with the multiple grooves.

In a particular embodiment of the hinge mechanism of the present invention shown in FIGS. 1, 4, 5, 8 and 8A, it has been found to be possible to reduce undesired "play" of the first hinge portion 1 and the second hinge portion 10 relative to one another. Because the flange portions 21, 21 on each axle 20, 28 must be received in recesses 2, 2 in each side 3, 5 of the first hinge portion 1, there is necessarily a certain amount of clearance between the periphery of the flanges 30 and the recess walls 7. The axles 20, 28 are, it will be remembered, identical, except that, as shown in FIG. 1, each points in a different direction. The second and third hinge portions 10, 40 are, by contrast, mirror images of one another.

Figure 8A:
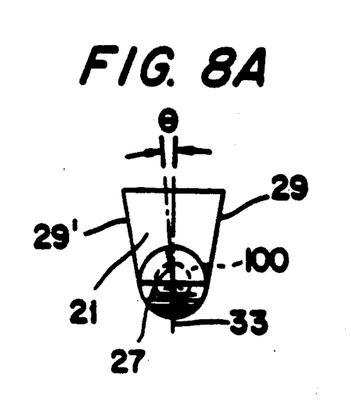
FIG. 8A is a view taken at 90° to FIG. 8.

The periphery 30 of the flange portions 21, 21 of the axles 20, 28 is formed to have two side edges 29, 29' and is fitted between two walls 7, 7' of the recesses 2, 2 of the first hinge portion. As can be seen in FIG. 8A, the V-shaped tips 27, 27 of the axles are formed to be at an angle Θ to a center line 33 bisecting the side edges 29,29' of the flange 21'. The V-shaped grooves 14, 14 in the second and third hinge portions 10, 40 are aligned with one another.

When the tips 27, 27 of the two axles 20, 28 are seated in the two grooves 14, 14 of the second and third hinge portions 10, 40, the side 29 of the flange 21 of the first axle 20 is closer to the wall 7 of the recess 2 than the side 29' is to the wall 7', and the side 29 of the flange 21 of the second axle is closer to the wall 7' of the recess 2 than the side 29' is to the wall 7. An angle measured between the sides 29 and 29 of the flanges 21 and 21 of the first and second axles 20, 28 is, therefore, greater than an angle measured between the sides 29, 29' of the flange 21 of either the first axle 20 or the second axle 28 alone. The first hinge portion 1 is, consequently, less prone to play than if the flanges 21, 21 were aligned with one another in the recesses 2, 2.

The angle Θ is shown, in FIG. 8A, as a small angle from the centerline 33. The angle Θ may, of course, be any desired angle. Good results have been achieved, however, by orienting the angles of the V-shaped tips 27, 27, relative to the centerline 33, 33 of the flanges 21, 21, such that the angle measured between the sides 29 and 29 of the flanges 21 and 21 when the tips 27, 27 are seated in corresponding grooves 14, 14 is approximately 6° greater than the angle measured between the sides 29, 29' of the flange 21 of either the first axle 20 or the second axle 28.

The embodiments referred to above and shown in the drawings are described as having a first hinge portion 1 having mirror image sides 3, 5, as having a mirror image second and third hinge portions 10, 40, and as having identical axles 20, 28. However, in a further embodiment of the invention shown in FIG. 9, the hinge mechanism has a first hinge portion 1 having a non-circular recess in only one side 3, there is no third hinge portion 40, there is only the one axle 20, and the first hinge portion 1 is held in a position relative to the second hinge portion 10 by either a passive force, such as gravity, or by a mechanical structure, such as the prong 70. The prong 70 is connected to the second hinge portion in one embodiment of the invention, and is separate from the second hinge portion and independently supported in another embodiment of the invention. The prong 70 may be pinned to the first hinge portion 1 by a hinge pin (not shown) on the same axis as the axle 20. In a further embodiment, there is no prong 70, and a force such as magnetism or gravity holds the first hinge portion 1 in an abutting relationship with the second hinge portion.

Figure 10:
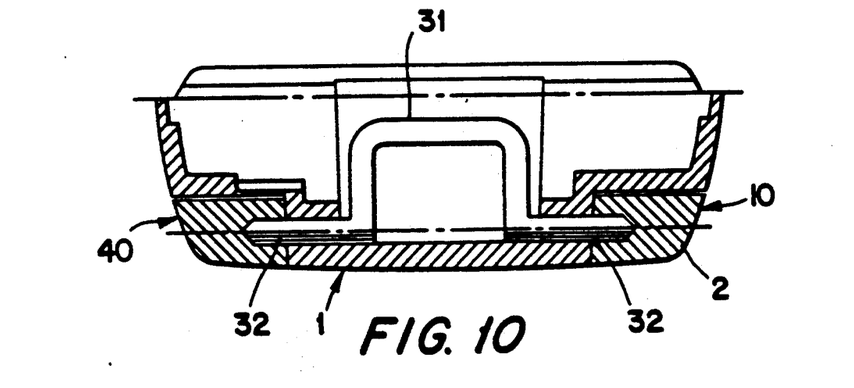
FIG. 10 is a cross-sectional view of an embodiment of the hinge mechanism of the present invention.

Instead of being provided with the above-described axles 20, 28 and compressible, resilient members 50 the hinge mechanism may be provided with a single piece U-shaped bar spring 31, shown in FIG. 10. The U-shaped bar spring 31 is formed to include elongated portions 32, 32 extending substantially perpendicularly to the legs of the "U", the elongated portions 32, 32 having V-tips 27, and the elongated portions otherwise completely corresponding in function to the elongated portions 24 of the axles 20, 28. The first hinge portion 1 receives or is built around the compressible U-shaped bar spring 31 such that the elongated portions 32, 32 extend outwardly from opposing sides 3, 5 of the first hinge portion 1. It is possible to construct a U-shaped bar spring of the invention from a single piece of wire.

Figure 11:
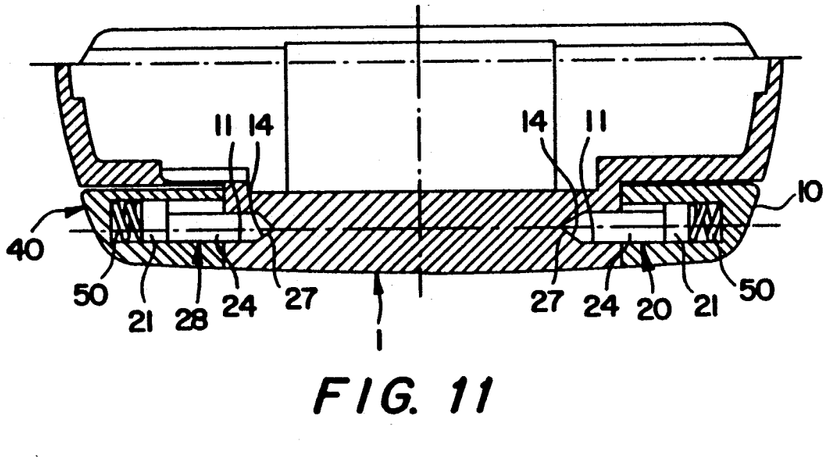
FIG. 11 is a cross-sectional view of an embodiment of the hinge mechanism of the present invention.

All of the foregoing embodiments of the present invention have assumed that the elongated portions 24, 32 project outwardly from the first hinge portion 1 into bores 11 in the second hinge portion 10. It will be appreciated by one skilled in the art, however, that the embodiments of the invention described herein can all be easily adapted such that the second ends 26 of the elongated portions 24 project inwardly toward the first hinge portion 1 out of the second hinge portion 10 into bores 11 in the first hinge portion, as seen in FIG. 11.

It is, of course, possible to embody the invention in specific forms other than those described above without departing from the spirit of the present invention. The embodiments described above are merely illustrative and should not be considered restrictive in any way. The scope of the invention is given in the appended claims, rather than the preceding description, and all variations and equivalents which fall within the range of the claims are intended to be embraced therein.

What is claimed is:

1. A hinge mechanism comprising:
   a first hinge portion having a non-circular recess extending to a predetermined recess depth along a first axis substantially perpendicular to a side of the first hinge portion;
   a second hinge portion having a bore extending partially through the second hinge portion to a bottom at a predetermined bore depth and along a second axis substantially perpendicular to a side of the second hinge portion, the bottom of the bore having one or more substantially V-shaped grooves therein;
   an axle for pivotally connecting the first and second hinge portions comprising a flange portion having a first and a second side separated by a predetermined height in the direction of the first axis, the flange portion being disposed in, axially movable in, and non-rotatable relative to the non-circular recess, and an elongated portion having a predetermined length and a first and a second end, the second end of the elongated portion being disposed in, axially movable in, and rotatable relative to the bore, the elongated portion projecting, at the first end thereof, from the first side of the flange portion, the elongated portion being formed with a substantially V-shaped tip at the second end thereof, the substantially V-shaped tip being adapted to engage with the one or more substantially V-shaped grooves; and
   means for urging the substantially V-shaped tip of the elongated member against the bottom of the bore and toward engagement with the one or more substantially V-shaped grooves,
   wherein the first axis is aligned with the second axis to form a common axis, the first and second hinge portions being in a substantially abutting relationship along at least portions of the sides thereof, and the predetermined recess depth is at least as great as the predetermined height of the flange portion plus the predetermined length of the elongated portion, and the predetermined bore depth is less than the predetermined length of the elongated portion.

2. A hinge mechanism as set forth in claim 1, the hinge mechanism further comprising a third hinge portion that is a mirror image of the second hinge portion, and a second axle for pivotally connecting the first and third hinge portions that is identical to the first axle, the first hinge portion having a first hinge portion opposite side that is a mirror image of the side of the first hinge portion, and the first hinge portion being fitted between the second and the third hinge portions, the urging means urging a substantially V-shaped tip of an elongated member of the second axle against a bottom of a bore in the third hinge portion and toward engagement with one or more substantially V-shaped grooves at the bottom of the bore in the third hinge portion.

3. A hinge mechanism as set forth in claim 2, wherein the second and the third hinge portions are attached to each other.

4. A hinge mechanism as set forth in claim 2, wherein the non-circular recess in the side of the first hinge portion and the non-circular recess in the opposite side of the first hinge portion are connected to one another by a passage.

5. A hinge mechanism as set forth in claim 4, wherein the urging means includes a compressible, resilient member, at least a portion of the compressible, resilient member being disposed in the passage, the compressible, resilient member abutting the second side of the flange of the first axle in the non-circular recess in the side and the second side of the flange of the second axle in the non-circular recess in the opposite side.

6. A hinge mechanism as set forth in claim 1, the hinge mechanism further comprising a third hinge portion that is a mirror image of the first hinge portion, and a second axle for pivotally connecting the first and third hinge portions that is identical to the first axle, the second hinge portion having an opposite side that is a mirror image of the side of the second hinge portion, and the second hinge portion is fitted between the first and the third hinge portions, the urging means urging a substantially V-shaped tip of an elongated member of the second axle against a bottom of a bore in the second hinge portion and toward engagement with one or more substantially V-shaped grooves at the bottom of the bore in the second hinge portion.

7. A hinge mechanism as set forth in claim 6, wherein the first and the third hinge portions are attached to each other.

8. A hinge mechanism as set forth in claim 6, wherein the urging means includes two compressible, resilient members, one of the compressible, resilient members being disposed in the non-circular recess of the first hinge portion and abutting against the second side of the flange of the first axle, another of the compressible, resilient members being disposed in a non-circular recess of the third hinge portion and abutting against a second side of a flange of the second axle.

9. A hinge mechanism as set forth in claim 2, wherein the flange portions of the first and second axles each have two side edges, a centerline passing between the two side edges of each flange, and the V-shaped tips of the first and second axles are formed at predetermined angles relative to the centerline.

10. A hinge mechanism as set forth in claim 9, wherein the V-shaped tips of the axles are formed at a 3° angle relative to the centerline.

11. A hinge mechanism as set forth in claim 1, further comprising means for preventing pivoting of the first hinge portion relative to the second hinge portion beyond a predetermined arc.

12. A hinge mechanism as set forth in claim 11, wherein the means for preventing pivoting prevents pivoting of the first hinge portion relative to the second hinge portion beyond a 180° arc.

13. A hinge mechanism as set forth in claim 12, wherein the substantially V-shaped tip and the one of the one or more substantially V-shaped grooves are aligned when the first hinge portion and the second hinge portion are at a single, predetermined angle relative to one another.

14. A hinge mechanism as set forth in claim 1, wherein the substantially V-shaped tip and one of the one or more substantially V-shaped grooves are aligned when the first hinge portion and the second hinge portion are at predetermined angles relative to one another.

15. A hinge mechanism as set forth in claim 1, wherein the urging means includes a compressible, resilient member disposed in the non-circular recess of the first hinge portion and abutting against the second side of the flange of the axle.

16. A hinge mechanism, comprising:
a first hinge portion having two sides, the first hinge portion having a recess extending in a direction perpendicular to the two sides;
a second hinge portion having two mirror-image prongs between which the two sides of the first hinge portion are fitted, each prong having a bore extending partially through the prong to a bottom at a predetermined bore depth and along an axis substantially perpendicular to an interior side of the prong, the bottom of each bore having one or more substantially V-shaped grooves therein; and
an axle pivotally connecting the first and second hinge portions comprising a substantially U-shaped bar spring having elongated portions extending perpendicularly outward from the legs of the U, the elongated portions having substantially V-shaped tips formed at outer ends thereof, each tip being adapted to engage with the one or more substantially V-shaped grooves at the bottom of a corresponding one of the bores,
wherein the elongated portions are received in the recess such that the elongated portions extend outwardly from the two sides of the first hinge portion means preventing relative rotation between the elongated portions and the recess, the predetermined bore depth being less than the length of the elongated portions, and the U-shaped bar spring urges the substantially V-shaped tip of the elongated portions against the bottom of the bore and toward engagement with the one or more substantially V-shaped grooves of each prong of the second hinge portion.

17. A portable apparatus having a hinge mechanism, comprising:
an apparatus door having a first hinge portion having a non-circular recess extending to a predetermined recess depth along a first axis substantially perpendicular to a side of the first hinge portion;

an apparatus body having a second hinge portion including a bore extending partially through the second hinge portion to a bottom at a predetermined bore depth and along a second axis substantially perpendicular to a side of the second hinge portion, the bottom of the bore having one or more substantially V-shaped grooves therein;

an axle pivotally connecting the first and second hinge portions comprising a flange portion having a first and a second side separated by a predetermined distance, the flange portion being disposed in, axially movable in, and non-rotatable relative to the non-circular recess, and an elongated portion having a predetermined length and a first and a second end, the second end of the elongated portion being disposed in, axially movable in, and rotatable relative to the bore, the elongated portion projecting, at the first end thereof, from the first side of the flange portion, the elongated portion being formed with a substantially V-shaped tip at the second end thereof, the substantially V-shaped tip being adapted to engage with the one or more substantially V-shaped grooves; and means for urging the substantially V-shaped tip of the elongated member against the bottom of the bore and toward engagement with the one or more substantially V-shaped grooves, wherein the first axis is substantially aligned with the second axis to form a common axis, the first and second hinge portions being in a substantially abutting relationship along at least portions of the sides thereof, and the predetermined recess depth is at least as great as the predetermined height of the flange portion plus the predetermined length of the elongated portion, and the predetermined bore depth is less than the predetermined length of the elongated portion.

18. A portable apparatus having a hinge mechanism as set forth in claim 17, wherein the apparatus door includes a telephone mouthpiece, and the apparatus body includes a telephone keyboard, the apparatus door covering the telephone keyboard when the first and second hinge portions are in a closed portion.

19. A hinge mechanism comprising:
a first hinge portion including a recess formed therein;

a second hinge portion including a bore formed therein, a bottom end of the bore having one or more substantially V-shaped grooves;

an axle having a first and a second end being disposed in and axially movable relative to the recess, means on the first end of the axle in cooperation with the recess for preventing relative rotation between the axle and the recess, the second end being disposed in, and axially and rotationally movable relative to, the bore, the second end being formed with a substantially V-shaped tip;

means for urging the substantially V-shaped tip against the bottom end of the bore and into engagement with one of the one or more substantially V-shaped grooves.

* * * * *